United States Patent
Ress

(10) Patent No.: US 12,278,761 B1
(45) Date of Patent: Apr. 15, 2025

(54) METHODS AND SYSTEMS FOR MESSAGE ROUTING USING ATTRIBUTES ASSOCIATED WITH THE SOURCE

(71) Applicant: Bandwidth Inc., Raleigh, NC (US)

(72) Inventor: David Ress, Cary, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/951,793

(22) Filed: Nov. 19, 2024

(51) Int. Cl.
  *H04L 12/28* (2006.01)
  *H04L 45/74* (2022.01)
  *H04W 76/40* (2018.01)

(52) U.S. Cl.
  CPC .......... *H04L 45/74* (2013.01); *H04W 76/40* (2018.02)

(58) Field of Classification Search
  CPC ............................. H04L 45/74; H04W 76/40
  USPC ........................................................ 370/351
  See application file for complete search history.

(56) References Cited

U.S. PATENT DOCUMENTS

| | | | | |
|---|---|---|---|---|
| 9,807,042 | B2 * | 10/2017 | Green | H04L 51/56 |
| 11,178,091 | B1 * | 11/2021 | Madhavan | H04L 47/50 |
| 11,552,979 | B1 * | 1/2023 | Soudhamma | H04L 45/22 |
| 2004/0156495 | A1 * | 8/2004 | Chava | H04W 92/02 370/328 |
| 2009/0138563 | A1 * | 5/2009 | Zhu | H04W 4/14 709/206 |
| 2011/0213657 | A1 * | 9/2011 | O'Malley | H04M 3/42017 379/88.19 |
| 2014/0161055 | A1 * | 6/2014 | Chitrapu | H04W 72/12 370/329 |
| 2017/0180303 | A1 * | 6/2017 | Debris | H04L 51/56 |
| 2017/0230285 | A1 * | 8/2017 | Crabtree | G06Q 10/0637 |
| 2018/0232807 | A1 * | 8/2018 | Crabtree | G06Q 40/04 |
| 2018/0300829 | A1 * | 10/2018 | Crabtree | G06Q 30/0205 |
| 2020/0068014 | A1 * | 2/2020 | Sarkar | G06F 9/542 |
| 2020/0076912 | A1 * | 3/2020 | Cortes | G06F 9/544 |
| 2021/0099492 | A1 * | 4/2021 | Crabtree | G06F 16/951 |
| 2021/0219206 | A1 * | 7/2021 | Zhu | H04L 45/74 |
| 2022/0070212 | A1 * | 3/2022 | Abzug | H04L 51/18 |
| 2024/0211311 | A1 * | 6/2024 | Crabtree | G06N 5/025 |
| 2024/0348655 | A1 * | 10/2024 | Crabtree | H04L 63/1425 |

* cited by examiner

*Primary Examiner* — Chuong T Ho
(74) *Attorney, Agent, or Firm* — Gregory Stephens

(57) ABSTRACT

Methods for routing messages to a destination are provided. The method includes determining a destination carrier for a destination telephone number (TN) of a destination associated with an end user. One or more source attributes are determined. A source attribute is associated with initiation of a message from a sender. Each of the one or more source attributes is categorized into one or more message classes associated with the sender. A message routing policy is determined for the message based on the determined destination carrier and the one or more message classes associated with the sender. The message is routed according to the message routing policy.

18 Claims, 10 Drawing Sheets

| Attribute | Description |
|---|---|
| provider-id | The provider (an aggregator or MNO) to whom the rule applies. |
| interface | Identifier of the specific interface to the provider to which traffic matching this rule may be sent. If blank, the traffic can be sent to any interface. |
| messageProtocolType | Describes a particular message type (e.g. SMS, MSS, RCS) that the rule is applicable to. |
| sourceAddressType | Describes the source address. For text messaging this is often a telephone number and the description may identify as long code, short code or toll free. In certain markets, the type is more specific such as geographic, non-geo, M2M, voip, wireless, etc. |
| sourceMessageClass | Any string value accepted. In a particular instance of the invention, the values A2P or P2P are commonly used. |
| sourceRoutingClass | String |
| sourceCampaignClass | String |
| destinationAddressType | See sourceAddressType. |
| destinationCountry | |
| destinationAddress | Rarely used - allows a rule to be defined for a very specific destinationAddress |
| destinationMarket | Describes the market that the destination address belongs to. When not present, the SMD applies to any market. In a particular instance of the invention, the values of NANP_US, NANP_OTHER and INTERNATIONAL are supported.. |
| destinationRegion | Defines a region within a market. In a particular instance of the invention the North American Numbering Plan LATA is used in this attribute |
| priority | The priority or weight of the SMD when compared to other SMDs that may match a CMD. |

FIG. 7

| | A | B | C | D | E | F | G | H | I | J | K | L | M | N | O | P | Q |
|---|---|---|---|---|---|---|---|---|---|---|---|---|---|---|---|---|---|
| 1 | | | | | | Source Attributes | | | | | | Destination Attributes | | | | | Rule Description |
| 2 | Rule # | provider-id | interface | providerType | messageProtocolType | sourceAddressType | sourceMessageClass | sourceRoutingClass | sourceCampaignId | sourceCampaignClass | sourceEntityId | destinationAddressType | destinationCountry | destinationMarket | destinationRegion | weight | |
| 3 | 1 | 1 | | AGG | SMS | LC | | | | | | | | | | 50 | Any LC message can be sent to aggregator 1 on any interface |
| 4 | | | | | | | | | | | | | | | | | |
| 5 | 2 | 3 | 1 | AGG | SMS | SC | | | | | | | | | | 50 | Any short code can be sent to aggregator 3 on interface 1 |
| 6 | 3 | 3 | 2 | AGG | SMS | TF | | | | | | | | | | 50 | Any toll freee can be sent to aggregator 3 on interface 2 |
| 7 | 4 | 3 | 3 | AGG | SMS | LC | | | | | | SC | | | | 50 | Any LC sent to a ShortCode can be sent to aggregator 3 on interface 3 |
| 8 | | | | | | | | | | | | | | | | | |
| 9 | 5 | 2 | 1 | MNO | SMS | LC | A2P | | | | | | | | | 100 | A2P Messages for a destination on MNO 2 can route directly to MNO 2 on interface 1 |
| 10 | 6 | 2 | 2 | MNO | SMS | LC | A2P | BAA | | | | | | | | 110 | A2P Messages for a destination on MNO 2 which contain HIPPA data can route directly to 2 on interface 2 |
| 11 | 7 | 2 | 3 | MNO | SMS | SC | | | | | | | | | | 100 | Any Shortcode for a destination on MNO 2 can route directly to MNO 2 on interface 3 |
| 12 | | | | | | | | | | | | | | | | | |
| 13 | 8 | 4 | 1 | MNO | SMS | LC | | | | A | | | | | | 100 | Any LC message assigned to a campaign with class A sending to a destination on MNO 4 can route directly on interface 1 |
| 14 | 9 | 4 | 2 | MNO | SMS | LC | | | | D | | | | | | 100 | Any LC message assigned to a campaign with class D sending to a destination on MNO 4 can route directly on interface 2 |
| 15 | 10 | 4 | 3 | MNO | SMS | LC | | | | W | | | | | | 100 | Any LC message assigned to a campaign with class W sending to a destination on MNO 4 can route directly on interface 3 |
| 16 | 11 | 4 | 4 | MNO | SMS | LC | | | | R | | | | | | 100 | Any LC message assigned to a campaign with class R sending to a destination on MNO 4 can route directly on interface 4 |
| 17 | | | | | | | | | | | | | | | | | |
| 18 | 12 | 10 | 1 | AGG | SMS | LC | P2P | | | | | | | | intl | 50 | Any P2P LC message assigned to an international destination can route to aggregator 10 on interface 1 |
| 19 | 13 | 10 | 2 | AGG | SMS | LC | A2P | | | | | | | | intl | 50 | Any A2P LC message assigned to an international destination can route to aggregator 10 on interface 2 |
| 20 | | | | | | | | | | | | | | | | | |
| 21 | 14 | 12 | | AGG | SMS | LC | A2P | | | | | | | nanp-other | 820 | 100 | Any A2P LC message sent to Puerto Rico (Lala820) can route to aggregator 12 on any interface |
| 22 | | | | | | | | | | | | | | | | | |
| 23 | 15 | 5 | 1 | MNO | SMS | LC | | | | | 103775 | | | NANP | | 100 | Any A2P LC message from entity 103775 sent to a destination on MNO 5 can route directly on interface 1 |

FIG. 8

METHODS AND SYSTEMS FOR MESSAGE ROUTING USING ATTRIBUTES ASSOCIATED WITH THE SOURCE

FIELD

The present inventive concept generally relates to routing and, more particularly, to routing messages through a telecommunication system based at least in part on source attributes.

BACKGROUND

Historically, algorithms for communication path route selection, particularly for text messaging, but also relevant for voice, video and other forms of media one way or two-way communication have been heavily based upon attributes of the destination. These destination attributes include, for example, destination address such as a Telephone Number (TN), session initiation protocol (SIP) Uniform Resource Locator (URL), Hyper Text Transfer Protocol (HTTP) Uniform Resource Identifier (URI) and the like; paths serving to connect a source location to the destination; cost related to using the paths; quality of the paths; availability of the paths; and the like.

Within the telecommunications realm, and in particular text messaging, evolving service offerings and restrictions expose limitations associated with solely relying on destination information for path selection.

SUMMARY

Some embodiments of the present inventive concept provide methods for routing messages to a destination. The method includes determining a destination carrier for a destination telephone number (TN) of a destination associated with an end user. One or more source attributes are determined. A source attribute is associated with initiation of a message from a sender. Each of the one or more source attributes is categorized into one or more message classes associated with the sender. A message routing policy is determined for the message based on the determined destination carrier and the one or more message classes associated with the sender. The message is routed according to the message routing policy.

Related systems and computer program products are provided.

BRIEF DESCRIPTION OF THE DRAWINGS

FIG. 7 is a table illustrating example source and destination attributes and related descriptions in accordance with some embodiments of the present inventive concept.

FIG. 8 is a table illustrating example routing rules utilizing source-based attributes in accordance with some embodiments of the present inventive concept.

DETAILED DESCRIPTION OF EMBODIMENTS

Figure 1:
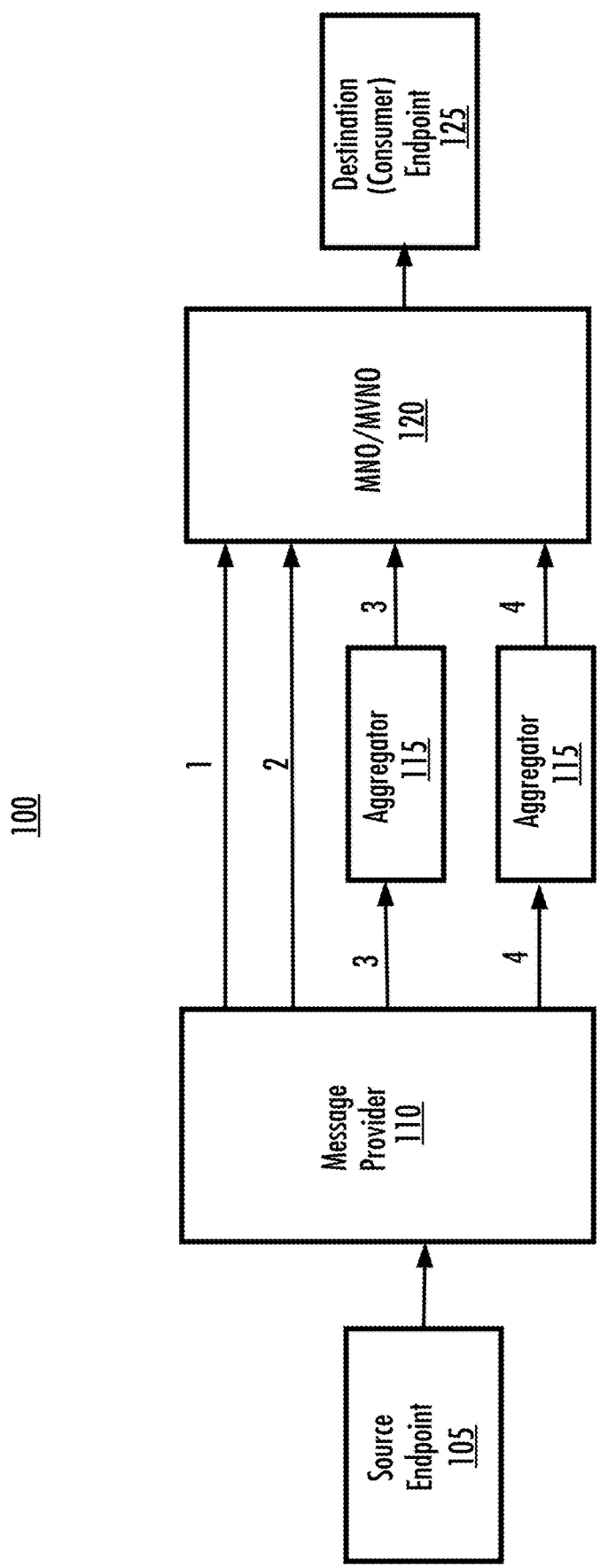
FIG. 1 is a block diagram illustrating a system for routing messages from a source endpoint to a destination endpoint in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed in the background, using only destination information when routing messages through a telecommunications system has become problematic, especially with respect to text messaging. These evolving service offerings and restrictions expose limitations associated with solely relying on destination information for path selection. Accordingly, some embodiments of the present inventive concept route messages through the system using source attributes as will be discussed further herein with respect to the figures.

Referring to FIG. 1, a system that routes messages from a source endpoint to a destination endpoint will be discussed. As illustrated, the system 100 includes a source endpoint 105, a message provider 110, one or more aggregators 115, a Mobile Network Operator (MNO) or Mobile Virtual Network Operator (MVNO) 120 and a destination endpoint 125. It will be understood that system 100 is provided as an example only and is not limited to the specific structure shown therein. Referring to the model system 100, in these embodiments a source endpoint/user 105 is served by the message provider 110.

The source endpoints 105 and/or destination endpoints may be, for example, a personal computer (PC), a mobile device such as smartphone, laptop, VoIP phone, IoT device, or another telephonic device without departing from the scope of the present inventive concept. These devices communicate over a network. The network may be provided by a group of technologies and is a method for the delivery of voice and text communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the public switched telephone network (PSTN). The PSTN network is an aggregate of the world's circuit-switched telephone networks that are operated by national, regional, or local telephone operators, providing infrastructure and services for public telecommunication. The network discussed herein may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 1002.11 WiFi), cellular network, and other communications networks.

Referring again to FIG. 1, the message provider 110 has four (4) different paths through which messages can be delivered to an MNO or MVNO 120 to a consumer (destination) endpoint 125. In the system illustrated in FIG. 1, access to each of the four paths is based upon destination attributes, for example, destination address such as a Telephone Number (TN), session initiation protocol (SIP) Uniform Resource Locator (URL), Hyper Text Transfer Protocol (HTTP) Uniform Resource Identifier (URI) and the like; paths (MNO/MVNO) serving the destination address serving to connect a source location to the destination; cost related to using the paths; quality of the paths; availability of the paths; and the like. Access to the destination addresses can be authorized or restricted based upon a number of attributes of the source endpoint/user 105. Examples source attributes include a sender address code type, a message class, a routing class, a campaign class, information particular to a source entity indicated by a unique source identifier and a campaign identifier and the like. Each of these source attributes are discussed below, however, embodiments of the present inventive concept are not limited thereto.

The sender address code type, i.e. the type of address from which the sender originates a message, often affects the set of paths that are permissible for delivering the message to a particular destination. These code types may include, for example, long codes, brand identifiers, toll free numbers, short code numbers and alpha codes. Long code numbers are assigned to many types of users and can be further broken down by a market specific type description which varies by a country's numbering plan. Examples include geographic numbers, non-geographic numbers, local numbers, Voice Over IP (VOIP) numbers, Machine to Machine (M2M) numbers, mobile numbers, and the like. In the system illustrated in FIG. 1, the route labeled (1) might be reserved for LC Geographic, non-Geographic and local numbers and the route labeled (2) for VoIP and M2M numbers. Thus, these routes are only used for messages with these specific codes.

A special case of long codes is toll free numbers (TFNs). TFNs often have different restrictions and permissions established by MNOs and may therefore not be permitted on the same routes as other types of numbers. TFNs are nearly always associated with A2P traffic. These might be served, for example, by the path labeled (4) in FIG. 1. As used herein, "A2P" messaging refers to any exchange of text messages, either one(1) way or two (2) way, between a traditional wireless subscriber and an agent acting on behalf of a business. The "agent" may be either a person or a machine. An A2P message campaign may be characterized as when an agent acting on behalf of a business coordinates the dissemination of text messages to a specific group of wireless subscribers.

Brand identifiers are non-telephone number identifiers (e.g., company name, entity name, etc.) that identify the sender of messages in an A2P message campaign. Unique brand identifiers are assigned by a registrar. The registrar is responsible for vetting and validating the sender. This often entails the registrar receiving information from and about the sender and independently verifying the veracity of the information such that the identity and purpose or business of the sender is known.

Short codes are a unique type of number and may be associated with special government or carrier services or A2P services. MNOs often have very specific rules and requirements for supporting messages from these types of numbers. Finally, alpha codes are supported in some markets as an explicit method of identifying an A2P sender.

The sender address code types discussed above provide classification that allow routing rules to be constructed, however, there are often other properties associated with message sources that may require further differentiation for routing purposes. These properties may include, for example, message class, routing class and campaign class, details of which are discussed below.

A message itself may have certain classification criteria that must be understood in order to identify an appropriate route. One typical use of message class is to differentiate between A2P and Person to Person (P2P) messages. In some embodiments this classification is inherent in the code type, such as TFN or Alpha. However, other code types may be ambiguous, such as with long codes, and must be explicitly identified in order to execute routing rules that appropriately handle the message. While A2P and P2P are common message class values, a message class is a free form alphanumeric expression that can be used for many purposes and is not limited to A2P and P2P.

Message classification may not be sufficient to construct routing rules. Attributes describing unique properties of the user or the type of service the user consumes are often complimentary. For example, some A2P classified messages may be associated with a service that requires special handling such as encryption or preferential treatment associated with things like HIPPA requirements, suicide prevention or emergency service. A routing classification can also be used to facilitate the migration of traffic from one platform to another.

In addition to message and route classifications, many markets require the definition of campaigns around A2P messages. Campaigns may be classified in a number of ways such as business size, non-profit, charity, political, social, and the like, with each classification in turn having different performance and filtering criteria. Different campaign classes may be served by different interfaces to a given provider or even be served by different providers.

Figure 2:
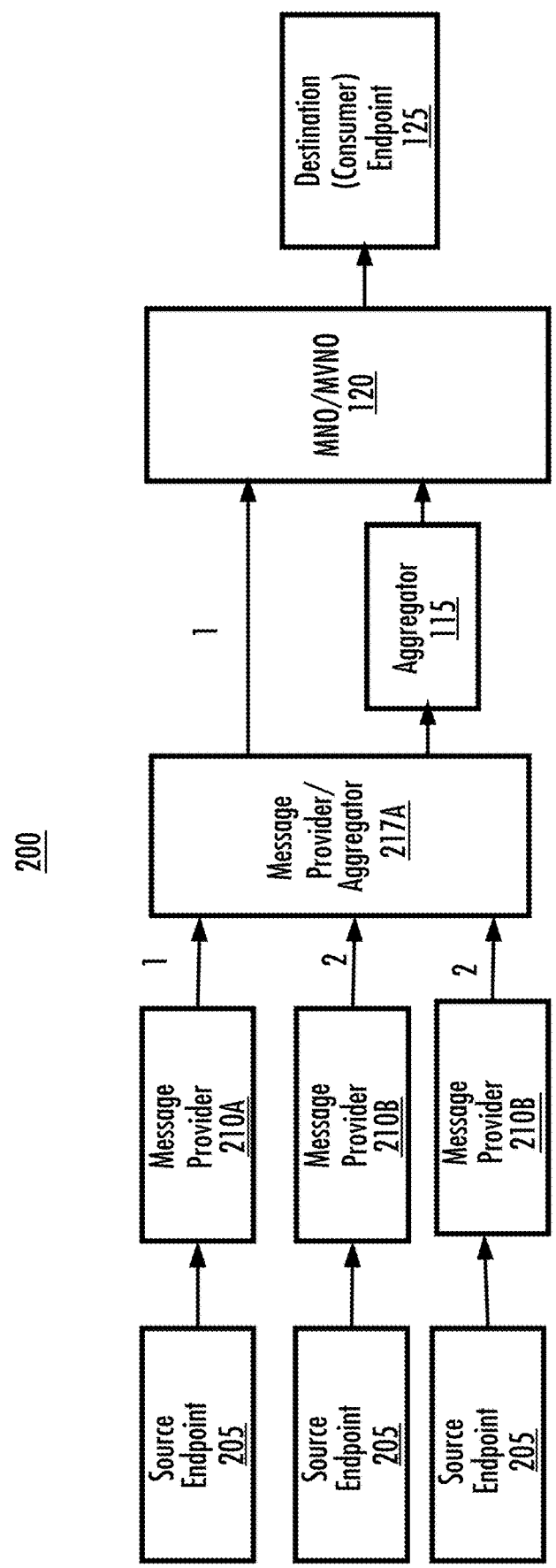
FIG. 2 is a block diagram illustrating a system for routing messages from multiples source endpoints to a destination endpoint in accordance with some embodiments of the present inventive concept.

Routing rules for aggregation purposes may also factor in information about the entity serving as the message provider to the source endpoint. FIG. 2 is a diagram of system 200, similar to the system 100 of FIG. 1. However, the system of FIG. 2 includes more than one source endpoint 205, a plurality of message providers 210A, 210B and 210C and a combined aggregator/message provider 217. As illustrated, aggregation can be a function of any message provider. In other words, a message provider may also aggregate traffic (217A) from other message providers 210A, 210B and 210C and so on.

In embodiments illustrated in FIG. 2, it is possible to have traffic that looks the same using the classification attributes discussed above (code type, message class, routing class, campaign class), but still requires different routing because of special arrangements or agreements between provider entities. In FIG. 2, Message Provider B 220B may have an agreement with message provider/aggregator 217A and the MNO 120 for preferential or direct routing. In these embodiments, a unique identifier associated with Message Provider B 210B can be used in a routing rule to identify route (1) to the MNO 120. Examples of such identifiers include, for example, NetNumber IDs (NNIDs), Service Provider IDs (SPIDs), Operating Company Numbers (OCNs), Mobile Country Code/Mobile Network Code (MCC/MNC) and the like.

Figure 3:
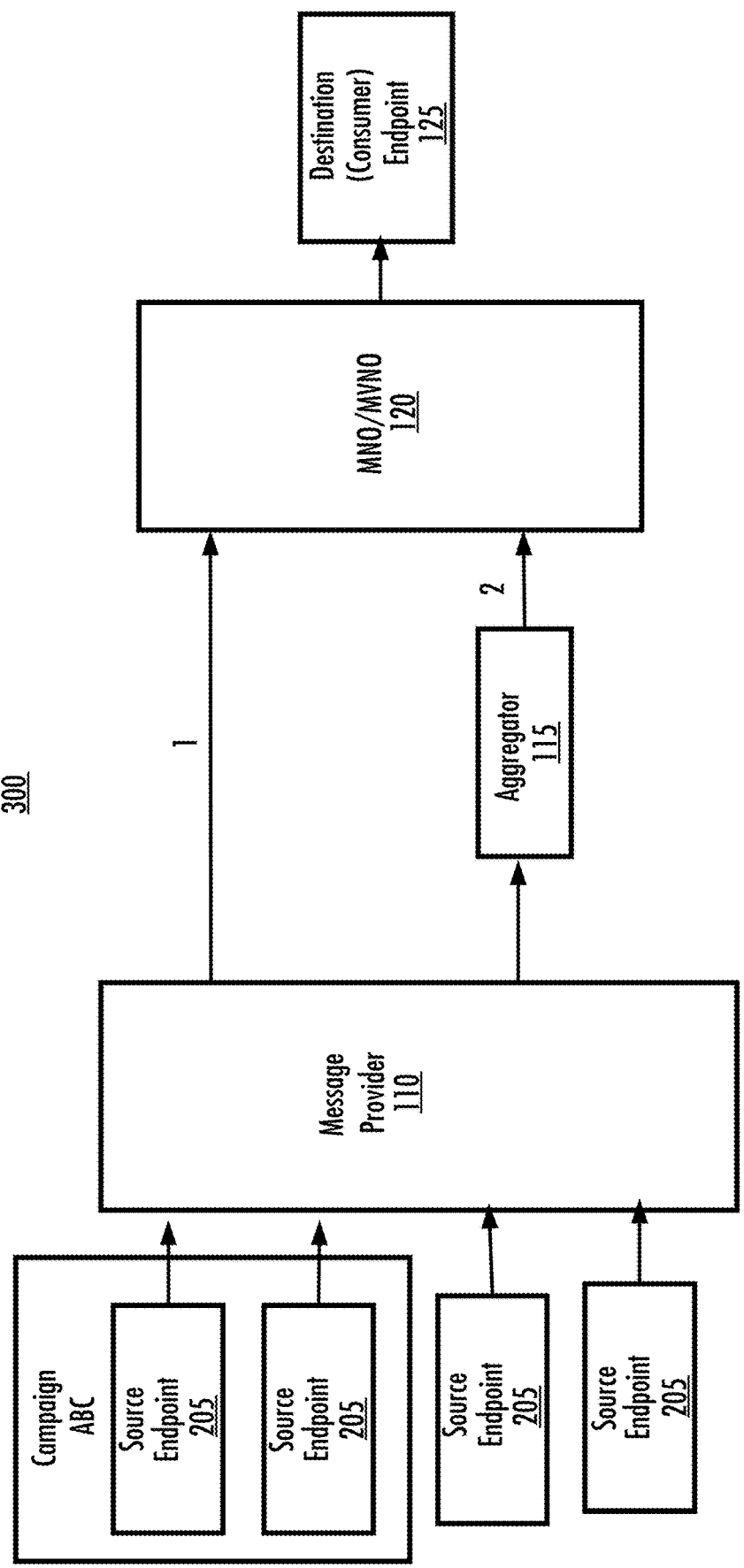
FIG. 3 is a block diagram illustrating a system for routing messages from a source endpoint to a destination endpoint illustrating a campaign in accordance with some embodiments of the present inventive concept.

Referring now to the system of FIG. 3, similar to the system of FIG. 1, however, FIG. 3 has multiple source endpoints and illustrates a campaign. It is possible for A2P users to negotiate preferable treatment for a particular campaign or set of campaigns. In FIG. 3, Campaign ABC has negotiated to take a direct route (1) to the MNO 120 while other messages default through an aggregator 115 on route (2). In these embodiments, a campaign identifier is used as a component of a routing rule to let the routing module know that the Campaign ABC traffic has a direct route (1).

Conventionally, messages are routed to a destination (end user) based solely on the attributes of the destination telephone number (TN), specifically, the carrier to which the TN is associated. For at least the reasons discussed above, only using the destination address to make routing decisions is no longer feasible as so many attributes of the source affect the routing of the message. Accordingly, as discussed above, embodiments of the present inventive concept gather multiple data points regarding the source endpoint (e.g., sender) of the message to influence or shape the routing policy to get the message to the destination. For example, the sender may be characterized into one or more classes or sub-classes wherein each class or sub-class may have an effect on the routing policy of a given message.

Figure 4:
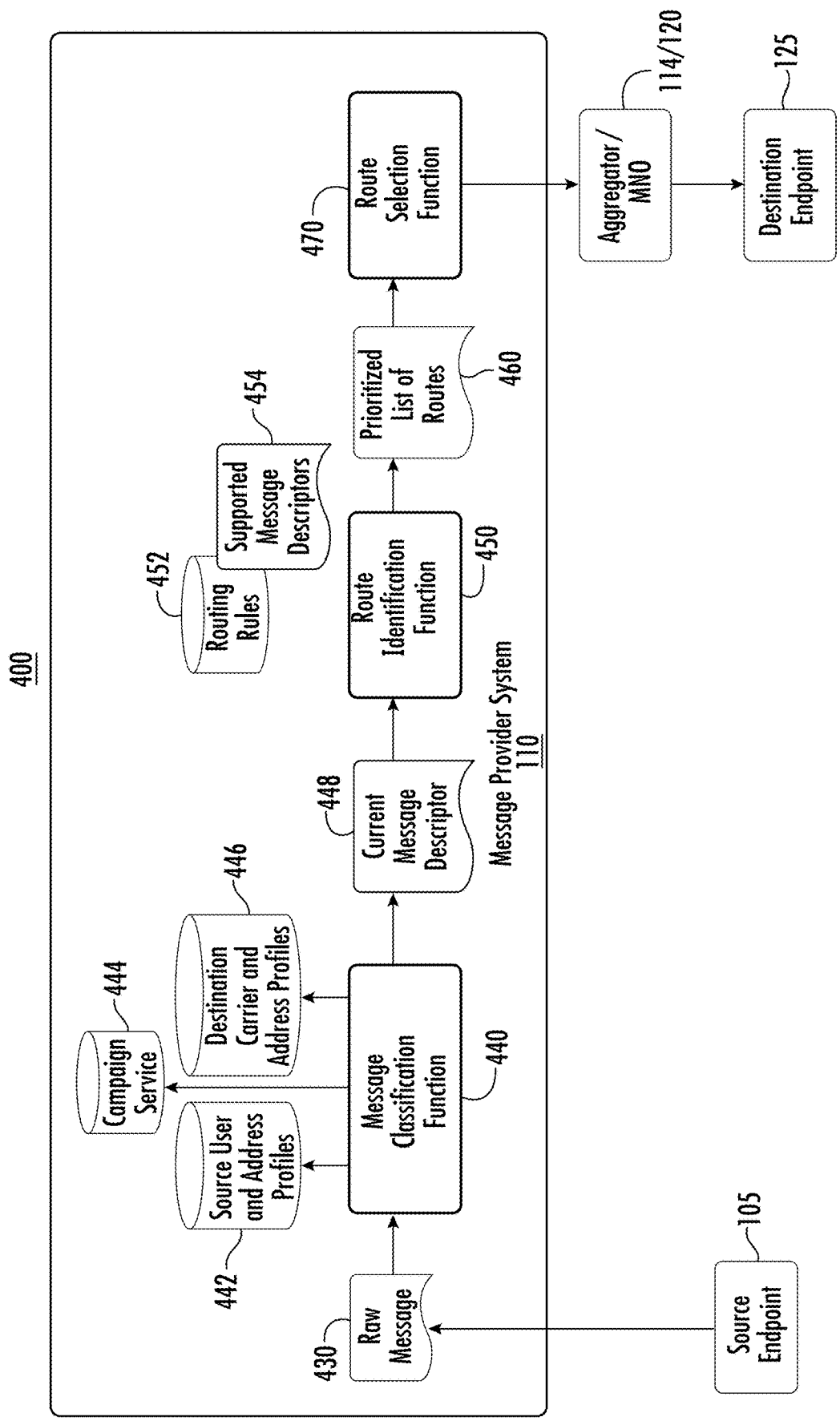
FIG. 4 is a block diagram of a system for routing a message from a source endpoint and a destination endpoint using source attributes in accordance with some embodiments of the present inventive concept.

Referring now to FIG. 4, an example system for delivering a routing solution incorporating both source and destination-based attributes will be discussed. As illustrated, the system 400 includes a source endpoint 105, a message provider 110, one or more aggregators 115, an MNO or MVNO 120 and a destination endpoint 125. FIG. 4 further illustrates the components of the message provider 110 in accordance with some embodiments of the present inventive concept, the details of which will be discussed below. It will be understood that FIG. 4 is provided as an example only and that embodiments of the present inventive concept are not limited there to. Blocks or modules may be added, deleted and/or combined without departing from the scope of the preset inventive concept.

Referring to FIG. 4, in accordance with some embodiments of the present inventive concept, the source endpoint 105 provides a raw message 430 to a message classification function 440 of the message provider 110. The message classification function 440 accepts a protocol compliant raw message 430 from the authorized source 105 and performs classification of the raw message 430 (blocks 442, 444 and 446). This classification may include assessment of source user and address profiles 442, campaign service 444 and/or destination carrier and address profiles 446. In particular, in some embodiments, classification may include, but is not limited to the following: identification and classification of the source address; identification and classification of the destination address; classification of the message class, which may involve reading data provisioned against a source user or address profile; classification of the routing class, which may involve reading data provisioned against a source user or address profile classification of the campaign class, which typically involves reading data provisioned against a campaign and maybe accessed through a supplementary campaign service; identification of the entity ID associated with the source party; identification of the destination MNO/MVNO (NNID, SPID, OCN, MCC/MNC, and the like); and identification of the destination market, country, locale (e.g. :local access transport area (LATA)) and the like. These examples are not intended to limit the message classification function 440 and are only provided to give context to the present example.

Based on the availability of some or all of the above discussed classifications, the MCF 440 creates a description of the message 4410 being processed, referred to herein as a current message descriptor (CMD) 4410 and passes the CMD 4410 to the Route Identification Function (RIF) 450.

The specific data sources used to derive the attributes which comprise the CMD will not be discussed herein as they are beyond the scope of the present inventive concept. As a reference, in some embodiments of the present inventive concept the following information sources may be used: Local Exchange Routing Guide (LERG), which is used to identify number block operating companies in North American Numbering Plan; Number Portability Database, which is used to identify number owners for ported TNs; the NetNumber Override Services Registry, which identifies a message provider authorized to provide messaging on a TN not operated by a typical MNO/MVNO and can also provide contextual information as to whether a TN is authorized for A2P messaging; Campaign Registration Databases, which describe campaign classes and other rules and characteristics of an A2P campaign; and locally configured data, which can be used to assign message class, routing class and other TN or A2P user attributes. It will be understood that embodiments of the present inventive concept are not limited to these examples.

Referring again to FIG. 4, the RIF 450 accepts the CMD 4410 created by the MCF 440 and examines a set of routing rules 452. In some embodiments of the present inventive concept, a routing rule may be expressed as a "Supported Message Descriptor" (SMD) 454. A rule, or SMD 454, attached to a provider known to the system describes a message that the provider will accept. The function of the RIF 450 is to match the CMD 4410 with SMDs 454 and return the provider routes associated with each of the matching SMDs 454.

Figure 5:
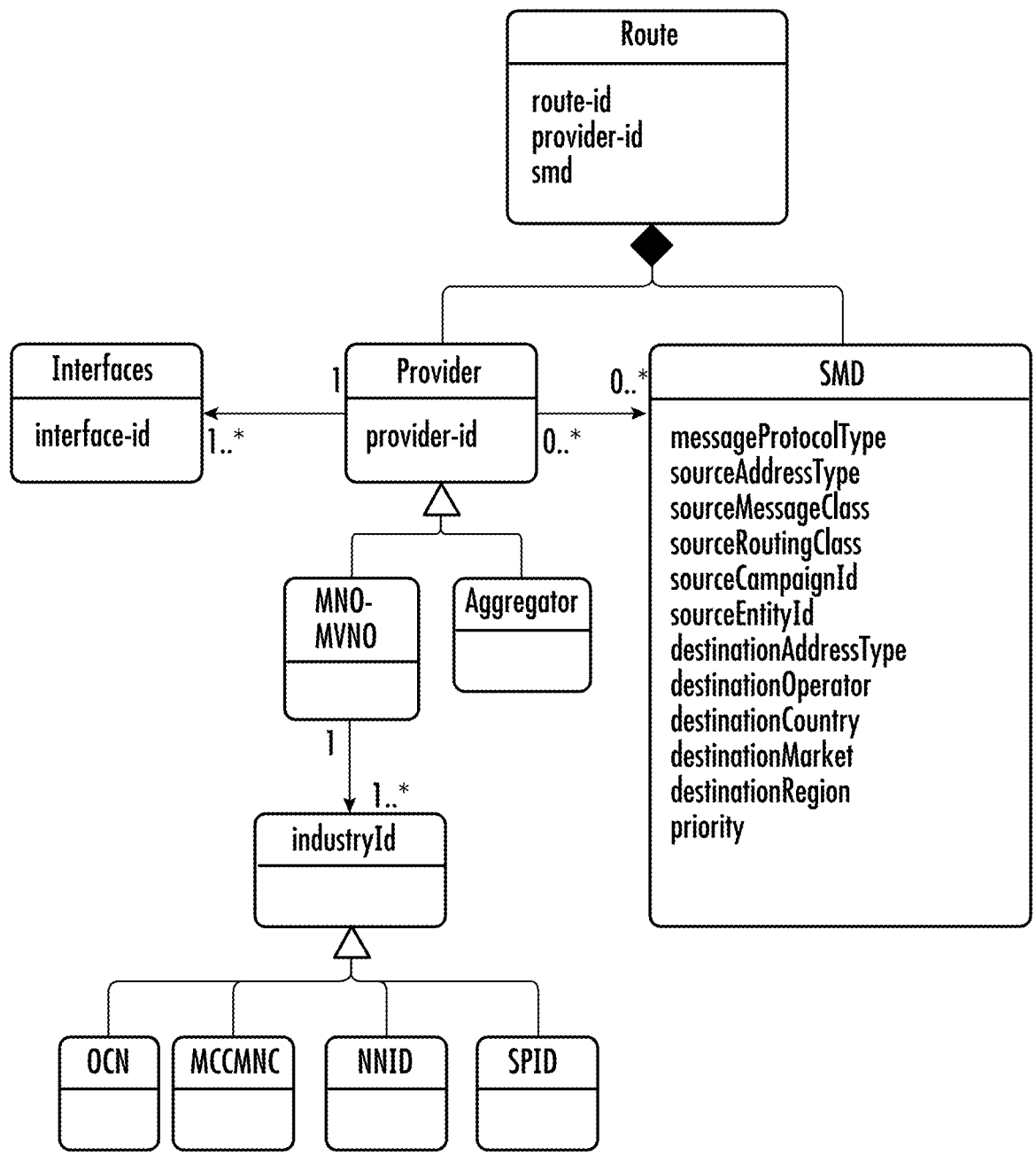
FIG. 5 is a block diagram illustrating relationships among key data elements of the system of FIG. 4 in accordance with some embodiments of the present inventive concept.

FIG. 5 is a diagram illustrating a reference model depicting the relationship among the key data elements of the model: Route, Provider, SMD and Interfaces. In some embodiments of the present inventive concept, a route can be defined as the combination of a provider, the description of a message that the provider is willing to accept and the list of the provider interfaces that can support a message conformant to the SMD. A provider may be either an MNO/MVNO or an aggregator. MNO/MVNOs are identified by industry IDs, which may be an OCN, SPID, MCCMNC, NNID or the like. Aggregators, which may have industry IDs as well, do not generally require industry IDs for routing rule support if they are effectively paths for messages to any MNO.

Figure 6:
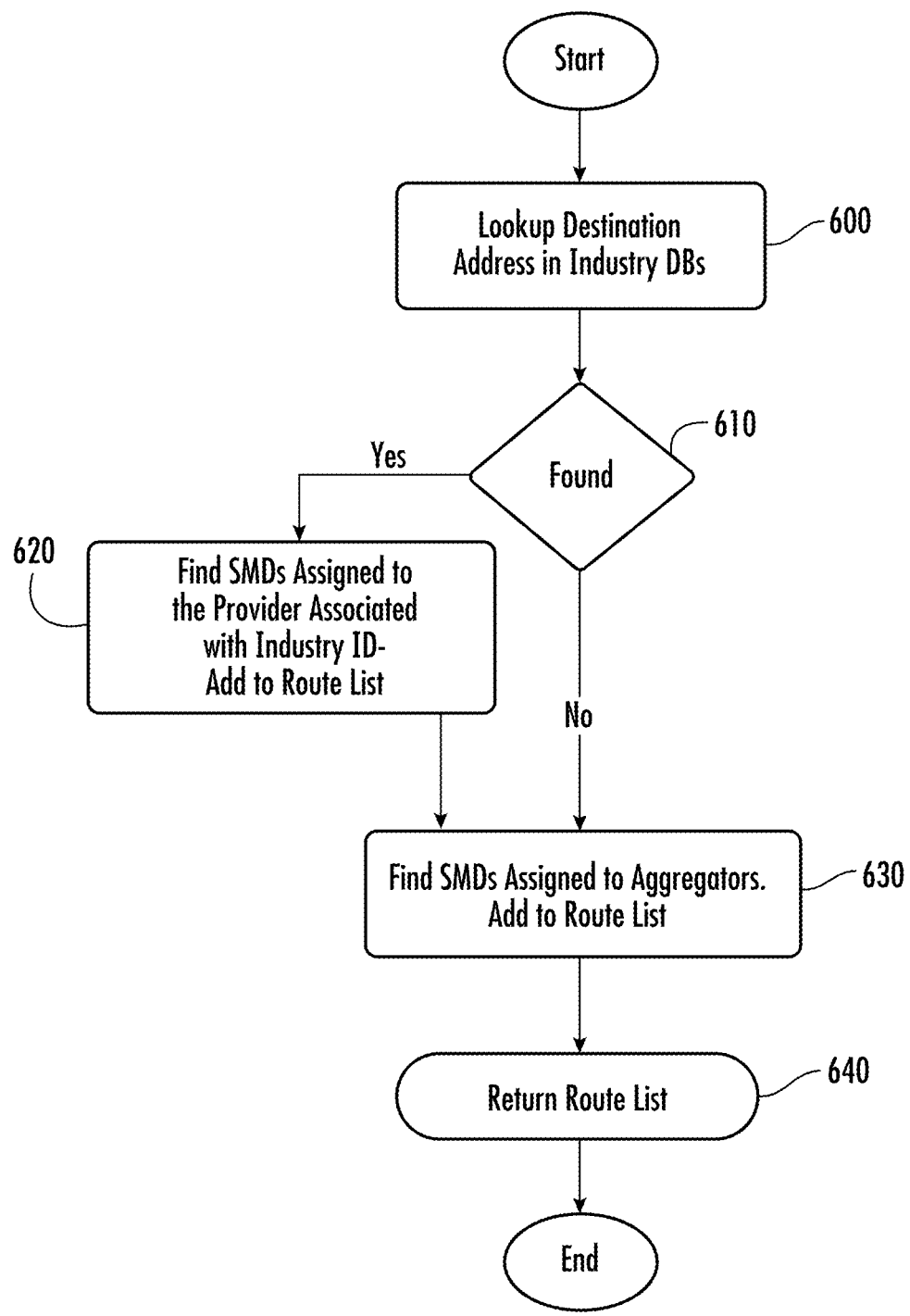
FIG. 6 is a flowchart illustrating operations of a route identification function (RIF) in accordance with some embodiments of the present inventive concept.

Referring now to FIG. 4 and the flowchart of FIG. 6, operations of the RIF 450 will be discussed. As illustrated, the RIF 450 first attempts to look up a destination address in industry databases (block 600). If found (block 610), the RIF 450 attempts to find routing rules 452 (SMDs) assigned to the provider (MNO/MVNO) with an industry ID that matches the CMD 4410 and add these routes to the route list (block 620). If the destination address is not found (block 610), SMDs assigned to aggregators are located that match the CMD 4410 and add these routes to the route list (block 630). The entire list 460 of SMDs 454 matching the CMD 4410 is returned by the RIF 450 (block 640).

In some embodiments of the present inventive concept, a routing rule is expressed as a supported message descriptor (SMD) which is a collection of some or all of the potential routing attributes. Typically, an actual SMD consists of only a few actual attributes. Any attributes not provided are assumed to be wildcarded (any value of the attribute satisfies the conditions of the SMD). An example list of supported message descriptors is listed in Table 1 of FIG. 7.

Referring again to FIG. 4, the route selection function (RSF) 470 accepts the list of routes sorted in priority order from the RIF 450. The RIF 450 attempts to deliver the message to the highest priority route although this could be affected by other criteria known to the RSF 470 which is not known to the RIF 450, such as route in service status, route congestion, and the like. Table 2 of FIG. 8 provides example routing rules utilizing the source-based attributes and destination-based attributes in accordance with some embodiments of the present inventive concept.

Figure 9:
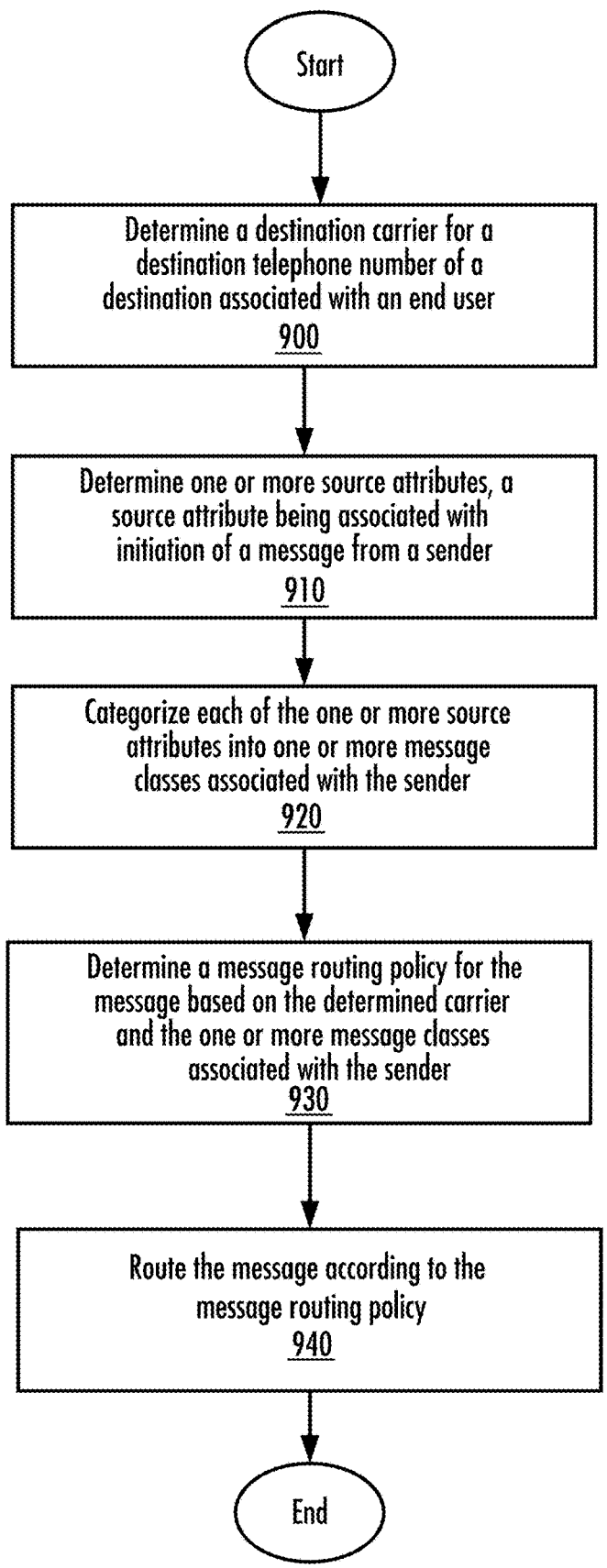
FIG. 9 is a flowchart illustrating operations for routing a message using source attributes in accordance with some embodiments of the present inventive concept.

Referring now to FIG. 9, a flowchart illustrating operations for routing messages to a destination utilized source attributes in accordance with some embodiments of the present inventive concept will be discussed. FIG. 9 illustrates an example only and does not represent all embodiments of the present inventive concept. Operations begin at block 900 by determining a destination carrier for a destination TN of a destination associated with an end user. One or more source attributes are determined (block 910). A source attribute is associated with initiation of a message from a sender. In some embodiments, the one or more source attributes may include, for example, a sender address code type, a message class, a routing class, a campaign class, information particular to a source entity indicated by a unique source identifier and/or a campaign identifier.

It will be understood that source attributes discussed above are provided for example and embodiments discussed herein are not limited thereto. The unique source identifier may include, for example, Netnumber IDs (NNIDs), service provider IDs (SPIDs), operating company numbers (OCNs), mobile country codes (MCCs) and/or mobile network codes (MNCs). The message class may include one of A2P and P2P. The sender address code type includes one or more of long codes, brand identifiers, toll free numbers, short code numbers and alpha codes. The routing class indicates a priority or special status associated with the message. The campaign class is a classification of one or more of, for example, business size, non-profit, charity, political and social. A selected campaign class determines performance criteria and filtering criteria associated with the massage. Each campaign class may have a negotiated performance and the negotiated performance may be identified by a campaign identifier associated with the campaign class.

Each of the one or more source attributes are categorized into one or more message classes associated with the sender (block 920). In some embodiments, a description of the message may be created based on the one or more source attributes and providing the description as a current message descriptor (CMD).

A message routing policy is determined for the message based on the determined destination carrier and the one or more message classes associated with the sender (block 930). In some embodiments, determining a message routing policy may include examining a set of supported message descriptor (SMD) routing rules and matching the SMDs with the CMD to provide a list of routes associated with each matching SMD. Finally, the message is routed according to the message routing policy (block 940). In some embodiments, routing the message may further include receiving the list of routes sorted by priority order and attempting to deliver the message using the route having a highest priority.

Although embodiments of the present inventive concept are directed to use of source attributes for routing of messages, some embodiments also determine the message routing policy based additionally on one or more destination attributes. The one or more destination attributes may include, for example, a destination address, paths connecting a source location to a destination; cost related to using paths; quality of paths; availability of the paths; a destination market and/or a destination region.

Figure 10:
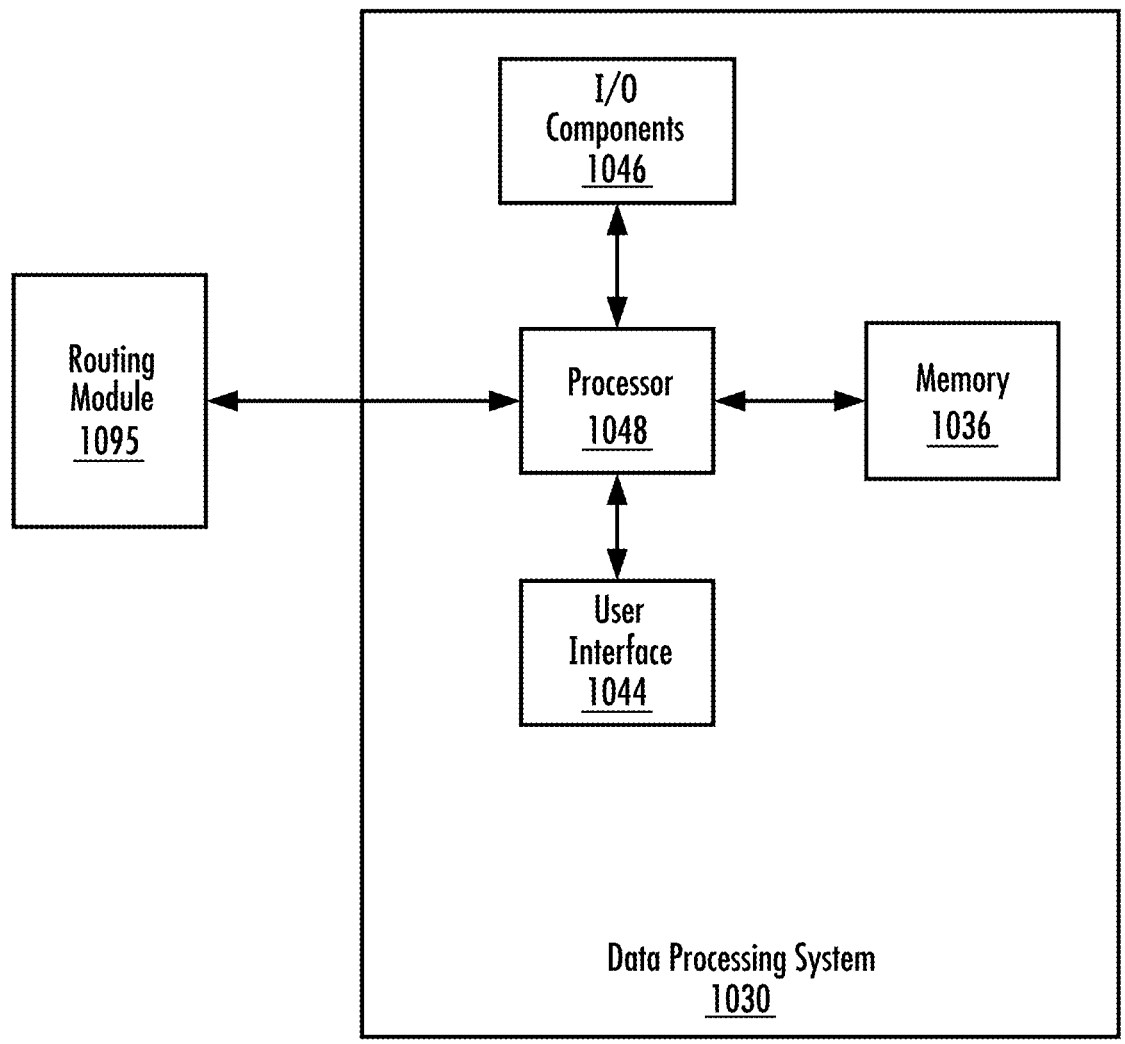
FIG. 10 is a high-level block diagram of a data processing system for use with a routing module in accordance with some embodiments of the present inventive concept.

Referring now to FIG. 10, an example of a data processing system 1030 suitable for use with any of the examples described above. Although the example data processing system 1030 is shown as in communication with the routing module 1095 in accordance with embodiments of the present inventive concept, the data processing system 1030 may also be part of the routing module 1095 or in any other component of the system without departing from the scope of the present inventive concept. In some examples, the data processing system 1030 can be any suitable computing device for performing operations according to the embodiments discussed herein described herein.

As illustrated, the data processing system 1030 includes a processor 10410 communicatively coupled to I/O components 1046, a user interface 1044 and a memory 1036. The processor 10410 can include one or more commercially available processors, embedded processors, secure processors, microprocessors, dual microprocessors, multi-core processors, other multi-processor architectures, another suitable processing device, or any combination of these. The memory 1036, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1030.

I/O components 1046 may be used to facilitate wired or wireless connections to devices such as one or more displays, game controllers, keyboards, mice, joysticks, cameras, buttons, speakers, microphones and/or other hardware used to input or output data. Memory 1036 represents nonvolatile storage such as magnetic, optical, or other storage media included in the data processing system and/or coupled to processor 10410.

The user interface 1044 may include, for example, a keyboard, keypad, touchpad, voice activation circuit, display or the like and the processor 10410 may execute program code or instructions stored in memory 1036.

It should be appreciated that data processing system 1030 may also include additional processors, additional storage, and a computer-readable medium (not shown). The processor(s) 10410 may execute additional computer-executable program instructions stored in memory 1036. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, the conventional scheme of using destination attributes to determine the route of messages through the system does not adequately address modern messaging. Thus, embodiments of the present inventive concept provide methods and systems that use source attributes to determine the route of messages through the system, which greatly increases the quality of service provided.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random-access memory (SRAM), dynamic random-access memory (DRAM), or magnetic random-access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A method for routing messages to a destination, the method comprising:
   determining a destination carrier for a destination telephone number (TN) of a destination associated with an end user;
   determining one or more source attributes, a source attribute being associated with initiation of a message from a sender, wherein the one or more source attributes comprise one or more of a sender address code type, a message class, a routing class, a campaign class, information particular to a source entity indicated by a unique source identifier and a campaign identifier;
   categorizing each of the one or more source attributes into one or more message classes associated with the sender;
   determining a message routing policy for the message based on the determined destination carrier and the one or more message classes associated with the sender;
   routing the message according to the message routing policy; and
   creating a description of the message based on the one or more source attributes and providing the description as a current message descriptor (CMD),
   wherein determining a message routing policy comprises examining a set of supported message descriptor (SMD) routing rules and matching the SMDs with the CMD to provide a list of routes associated with each matching SMD.

2. The method of claim 1, wherein routing the message further comprises receiving the list of routes sorted by priority order and attempting to deliver the message using the route having a highest priority.

3. The method of claim 1, wherein the unique source identifier comprises one or more of Netnumber IDs (NNIDs), service provider IDs (SPIDs), operating company numbers (OCNs), mobile country codes (MCCs) and mobile network codes (MNCs).

4. The method of claim 1, wherein the message class comprises one of application to person (A2P) and person to person (P2P).

5. The method of claim 1, wherein the sender address code type comprises one or more of long codes, brand identifiers, toll free numbers, short code numbers and alpha codes.

6. The method of claim 1, wherein the routing class indicates a priority or special status associated with the message.

7. The method of claim 6, wherein the campaign class comprises a classification of one or more of business size, non-profit, charity, political and social and wherein a selected campaign class determines performance criteria and filtering criteria associated with the message.

8. The method of claim 1, wherein determining the message routing policy further comprises determining the message routing policy based additionally on one or more destination attributes.

9. The method of claim 8, wherein the one or more destination attributes comprise one or more of a destination address, paths connecting a source location to a destination; cost related to using paths; quality of paths; availability of the paths; a destination market and a destination region.

10. A message provider system that routes messages to a destination, the system being configured to:
    determine a destination carrier for a destination telephone number (TN) of a destination associated with an end user;
    determine one or more source attributes, a source attribute being associated with initiation of a message from a sender, wherein the one or more source attributes comprise one or more of a sender address code type, a message class, a routing class, a campaign class, information particular to a source entity indicated by a unique source identifier and a campaign identifier;
    categorize each of the one or more source attributes into one or more message classes associated with the sender;
    determine a message routing policy for the message based on the determined destination carrier and the one or more message classes associated with the sender;
    route the message according to the message routing policy;
    create a description of the message based on the one or more source attributes and provides the description as a current message descriptor (CMD); and
    determine a message routing policy by examining a set of supported message descriptor (SMD) routing rules and matching the SMDs with the CMD to provide a list of routes associated with each matching SMD.

11. The system of claim 10, wherein the system further routes the message by receiving the list of routes sorted by priority order and attempting to deliver the message using the route having a highest priority.

12. The system of claim 10, wherein the unique source identifier comprises one or more of Net number IDs (NNIDs), service provider IDs (SPIDs), operating company numbers (OCNs), mobile country codes (MCCs) and mobile network codes (MNCs).

13. The system of claim 10, wherein the message class comprises one of application to person (A2P) and person to person (P2P).

14. The system of claim 10, wherein the sender address code type comprises one or more of long codes, brand identifiers, toll free numbers, short code numbers and alpha codes.

15. The system of claim 10, wherein the routing class indicates a priority or special status associated with the message.

16. The system of claim 15, wherein the campaign class comprises a classification of one or more of business size, non-profit, charity, political and social and wherein a selected campaign class determines performance criteria and filtering criteria associated with the message.

17. The system of claim 10, the system determines the message routing policy by determining the message routing policy based additionally on one or more destination attributes.

18. The system of claim 17, wherein the one or more destination attributes comprise one or more of a destination address, paths connecting a source location to a destination; cost related to using paths; quality of paths; availability of the paths; a destination market and a destination region.

\* \* \* \* \*